(12) United States Patent
Budde et al.

(10) Patent No.: US 7,278,071 B2
(45) Date of Patent: Oct. 2, 2007

(54) RECEIVING CIRCUIT FOR RECEIVING MESSAGE SIGNALS

(75) Inventors: Wolfgang Otto Budde, Aachen (DE); Peter Fuhrmann, Aachen (DE)

(73) Assignee: NXP B.V., Eindhoven (NL)

( * ) Notice: Subject to any disclaimer, the term of this patent is extended or adjusted under 35 U.S.C. 154(b) by 666 days.

(21) Appl. No.: 10/293,773

(22) Filed: Nov. 12, 2002

(65) Prior Publication Data

US 2003/0095611 A1  May 22, 2003

(30) Foreign Application Priority Data

Nov. 16, 2001  (DE) ............... 101 56 111

(51) Int. Cl.
*H03M 13/33* (2006.01)

(52) U.S. Cl. ................... 714/708; 714/798

(58) Field of Classification Search ......... 714/798, 714/708

See application file for complete search history.

(56) References Cited

U.S. PATENT DOCUMENTS

| | | | | |
|---|---|---|---|---|
| 3,573,727 A * | 4/1971 | Freeny | ....... | 714/709 |
| 3,761,818 A * | 9/1973 | Tazaki et al. | ....... | 375/293 |
| 3,787,826 A * | 1/1974 | Norris | ....... | 360/43 |
| 3,818,347 A * | 6/1974 | Holsinger | ....... | 375/340 |
| 4,180,701 A * | 12/1979 | Louth et al. | ....... | 375/359 |
| 4,234,897 A * | 11/1980 | Miller | ....... | 360/45 |
| 4,348,762 A * | 9/1982 | Shiun et al. | ....... | 714/798 |
| 4,360,926 A * | 11/1982 | Hedin et al. | ....... | 375/376 |
| 4,414,676 A * | 11/1983 | Kraul et al. | ....... | 375/368 |
| 4,443,883 A * | 4/1984 | Berger | ....... | 375/368 |
| 4,520,408 A * | 5/1985 | Velasquez | ....... | 360/51 |
| 4,782,489 A * | 11/1988 | Moulsley | ....... | 714/746 |
| 4,872,107 A * | 10/1989 | Marple et al. | ....... | 711/111 |
| 5,097,488 A * | 3/1992 | Kokubo et al. | ....... | 375/354 |
| 5,140,620 A * | 8/1992 | Woodward | ....... | 375/375 |
| 5,297,181 A * | 3/1994 | Barr et al. | ....... | 375/373 |
| 5,481,563 A * | 1/1996 | Hamre | ....... | 375/226 |
| 5,715,278 A * | 2/1998 | Croft et al. | ....... | 375/368 |
| 5,761,211 A * | 6/1998 | Yamaguchi et al. | ....... | 714/707 |
| 5,956,376 A * | 9/1999 | Nakaya et al. | ....... | 375/340 |
| 5,963,605 A * | 10/1999 | Yasui | ....... | 375/368 |
| 6,249,896 B1 * | 6/2001 | Ho et al. | ....... | 714/814 |
| 6,317,471 B1 * | 11/2001 | Horigome et al. | ....... | 375/341 |
| 6,437,710 B1 * | 8/2002 | Tam et al. | ....... | 341/58 |
| 6,529,148 B1 * | 3/2003 | Maddux | ....... | 341/100 |
| 6,577,696 B1 * | 6/2003 | Burgmeier et al. | ....... | 375/376 |
| 6,584,163 B1 * | 6/2003 | Myers et al. | ....... | 375/360 |
| 6,587,527 B1 * | 7/2003 | Tani et al. | ....... | 375/357 |
| 6,625,772 B1 * | 9/2003 | Stoll | ....... | 714/746 |
| 6,763,477 B1 * | 7/2004 | McGee | ....... | 713/600 |
| 6,792,063 B1 * | 9/2004 | Ogura | ....... | 375/375 |
| 6,804,314 B2 * | 10/2004 | Kobori | ....... | 375/354 |
| 6,839,380 B1 * | 1/2005 | Ding et al. | ....... | 375/149 |
| 6,865,240 B1 * | 3/2005 | Kawataka | ....... | 375/368 |
| 6,914,947 B2 * | 7/2005 | Persson et al. | ....... | 375/340 |
| 6,920,576 B2 * | 7/2005 | Ehmann | ....... | 713/400 |
| 6,957,382 B2 * | 10/2005 | Budde et al. | ....... | 714/820 |
| 6,980,586 B1 * | 12/2005 | Ballinger | ....... | 375/150 |
| 2003/0103590 A1 * | 6/2003 | Budde et al. | ....... | 375/355 |

* cited by examiner

*Primary Examiner*—Stephen M. Baker

(57) ABSTRACT

The invention relates to a receiving circuit for receiving message signals, having a sampler for converting the message signal into a sampled signal, an analyzing unit for decoding the sampled signal and checking it for errors, and a control unit for controlling the sampling method as a function of the error-check on the sampled signal.

19 Claims, 1 Drawing Sheet

RECEIVING CIRCUIT FOR RECEIVING MESSAGE SIGNALS

The invention relates to a receiving circuit for receiving message signals, having a sampler for converting the message signal into a sampled signal.

A signal that contains information that is coded in any desired way. A sampler is a member that samples the message signal at definable points in time and converts it into a sampled signal.

When being transmitted over communications channels or before being recorded on a data carrier, messages or sets of data are typically coded in such a way that errors caused by disturbances on the channel or faults on the data carrier can be recognized or even corrected when the message or data set is received.

Phase errors, for example, may occur as a result of inaccuracies in bit synchronization between transmitter and receiver. A known method of avoiding phase errors is edge-based resynchronization, i.e. the bit timing of the receiver is adjusted to the data stream on receipt of each edge in the message. A method of this kind where the length of a bit time is adjusted on the basis of an edge that is recognized, is known, for example, from the CAN Specification, version 1.2, Robert Bosch GmbH, 1990. However, when the input signals are badly affected by noise, this method may result in the bit synchronization unlocking completely and hence in the message content being lost.

It is an object of the invention to provide a receiving circuit and a related method that make possible the improved reception of messages.

This object is achieved in accordance with the invention by a receiving circuit for receiving message signals, having a sampler for converting the message signal into a sampled signal, an analyzing unit for decoding the sampled signal and checking it for errors, and a control unit for controlling the sampling method as a function of the error-check on the sampled signal.

The invention includes adapting the sampling method performed in the sampler to the characteristics of the message signal received. For this purpose, an error check is carried out on the sampled signal in an analyzing unit, errors that occur are reported to a control unit and the control unit controls the sampling method as a function of the errors found by the analyzing unit. As a result the receiver is able to react actively and flexibly to varying characteristics of the message signal received. A change in the characteristics of the message signal received takes place, in particular, as a result of varying channel characteristics. A communications channel is subject to a wide variety of error-generating influences that act on the message signal to be transmitted and change its characteristics.

A distinction can be made between amplitude errors and phase errors as basic kinds of error that occur in the transmission of messages along a communications channel. Whereas amplitude errors typically cause single-bit or multi-bit errors, phase errors may damage, e.g. invert, the entire contents of messages. By means of the receiving circuit according to the invention, it is possible for a first sampling method to be used when, for example, amplitude errors occur and for another, second sampling method to be switched to when phase errors occur. The sampling method that is better at the time may be selected in dependence on whether it is amplitude or phase errors that predominate. By means of adaptive sampling of this kind, the probability of being able to reconstruct the original message from the signal received is considerably increased.

The principles of this invention can be used in all areas of application in the fields of communications and storage technology. In particular, applications where safety is critical in automobile engineering, industrial automation, medical technology, etc. will benefit from the adaptive sampling in respect of the cost that has to be paid for the envisaged safety level.

Sampling in a fixed sampling pattern is preferably implemented in the sampler as a first sampling method. In a fixed sampling pattern the message signal received is sampled at intervals that are preset as fixed cycles. Provision is made for bitwise resynchronization in the sampler as a second sampling method, i.e. the message signal received is synchronized with the sampling pattern of the sampler at each individual received bit. The first sampling method using a fixed sampling pattern could, for example, be implemented in the sampler as a basic method, i.e. on receipt of a message, signal sampling to a fixed sampling pattern is always performed first. It is not until the analyzing unit supplies error messages to the control unit that the control unit decides, as a function of these error messages, whether switching to the second sampling method, for example, the sampling method employing bitwise resynchronization, promises to be more successful. If it does, a switch is made to the second sampling method.

The receiving circuit can be used with particular advantage for receiving edge coded signals. Edge-coded signals are signals in which the information that the message signal contains is conveyed by the temporal sequence in which the changes of edge occur. Edge-coded signals are particularly sensitive to phase errors. With signals of this kind, it would, for example, therefore be advantageous for provision to be made for edgewise or bitwise resynchronization as the basic sampling method. When, however, the input signals are badly affected by noise, a method of this kind may result in the bit synchronization unlocking completely and hence in the message content being lost. If this happened, it would be detected by the analyzing unit and a change would be made to a method using a fixed sampling pattern. The receiving circuit according to the invention affords particular advantages for the reception of Xerxes-coded signals.

In the advantageous embodiment of the invention, the sampler is implemented in the form of an analog-to-digital converter. An analog-to-digital converter of this kind makes possible a higher degree of quality analysis. By means of an analog-to-digital converter of this kind it is possible with signal edges of shallow gradient to estimate the position of the edges from the waveform of the signal. This is particularly advantageous with edge-coded signals. The analog-to-digital converter should have a bandpass filter connected upstream of it to prevent aliasing. As an alternative, the sampler may advantageously be implemented in the form of a threshold discriminator. A threshold discriminator of this kind is particularly simple and inexpensive to implement. The threshold discriminator is preferably implemented to employ n-times oversampling. A threshold discriminator of this kind emits a sequence of zeros and ones as its output signal.

It is advantageous not to switch over to a different sampling method immediately if an error occurs, but first to wait for and assess a plurality of error messages so that a changeover can then be made if required. This prevents that merely singular or transient disturbances on the transmission channel cause a changeover to another sampling method.

The analyzing unit preferably comprises a decoding unit with a checking unit connected downstream of it. The decoding unit decodes the sampled signal supplied by the sampler. Provision may also be made for the decoding unit to monitor the sampled signal at code level. Monitoring at code level means that the decoder indicates injuries of any kind to the code. Connected downstream of the decoder there is preferably a checking unit that makes a check for errors at message or data level. This may be a cyclic redundancy check (CRC), for example.

These and other aspects of the invention are apparent from and will be elucidated with reference to the embodiments described hereinafter:

Figure 1:
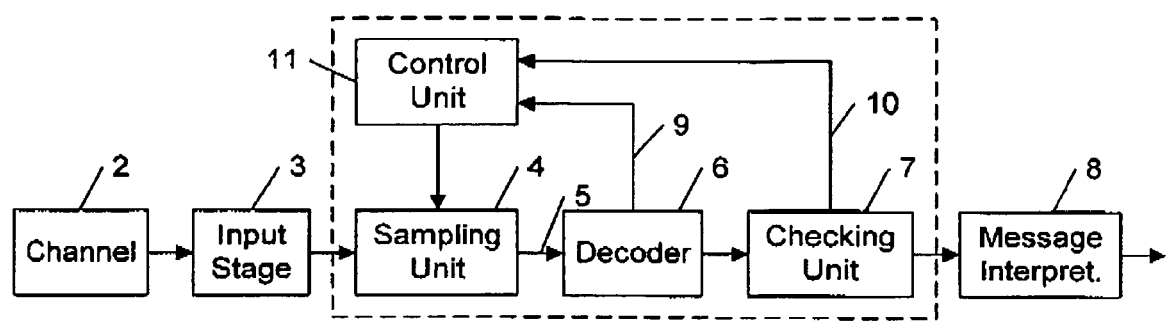
FIG. 1 illustrates a block diagram of an example receiving circuit.

FIG. 1 shows a receiving circuit for receiving message signals. A message signal transmitted by a communications channel 2 is fed to an input stage 3 of the receiving circuit. The input stage 3 comprises, for example, an HF mixer and an IF mixer and various filter circuits. The input stage 3 performs analog pre-processing of the message signal 1 received. The message signal 1 that has undergone analog pre-processing by the input stage 3 is fed to a sampling unit 4 and converted into a sampled signal 5. Connected downstream of the sampling unit 4 is a decoder 6. Connected downstream of the decoder 6 is a checking unit 7. Finally, connected downstream of the checking unit 7 there is a message interpretation unit 8. The decoder 6 supplies an error signal 9 and the checking unit 7 an error signal 10 to a control unit 11. The control unit 11 supplies a control signal 12 to the sampling unit 4.

Figure 2:
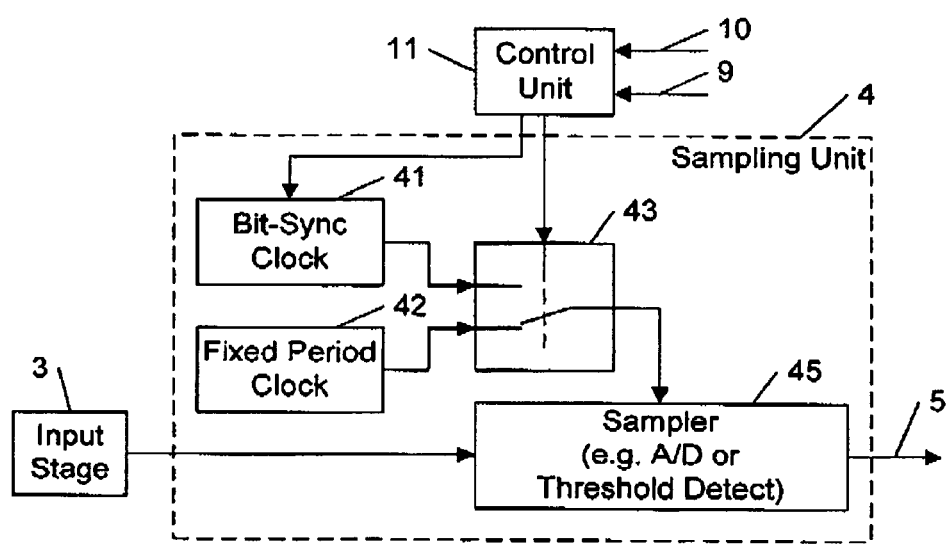
FIG. 2 illustrates a block diagram of an example sampling unit for use in a receiving circuit.

As illustrated in FIG. 2, a sampler 45 in the sampling unit 4 may be include a threshold discriminator employing n-times oversampling. Alternatively, a low-resolution analog-to-digital converter may be used as the sampler 45. The latter makes possible more quality analysis and with edge-coded signals it is, for example, possible to estimate the position of the edges from the waveform of the signal even with signal edges of shallow gradient. The decoder 6 decodes the sampled signal 5 supplied by the sampling unit 4 and also monitors the sampled signal at code level for possible injuries to the code. If the decoder 6 finds any injuries of this kind to the code, it supplies an error signal 9 to the control unit 11. The checking unit 7 connected downstream of the decoder 6 monitors at message level, i.e. checks at the level of the reconstructed bit stream. This may be done by means of a CRC (cyclic redundancy check) for example. If the checking unit 7 finds an error, it supplies an error signal 10 to the control unit 11. The message interpretation unit 8 performs further message processing or data processing.

The control unit 11 controls the sampling method performed in the sampling unit 4 as a function of the error signals 9 and 10. As a first sampling method, sampling to a fixed sampling pattern for example may be implemented in the sampling unit 4, as illustrated in FIG. 2. The sampling unit 4 samples the message signal 1 fed to it and converts it into the sampled signal 5 at intervals of time of a fixed cyclic length, using, for example, a fixed period clock 42. As a second sampling method, sampling with bitwise resynchronization, for example, may be implemented in the sampling unit 4, using, for example, a bit-synchronized clock 41. The bit timing of the sampler 45 is adjusted to the received data stream on receipt of each bit, i.e., in the case of edge-coded signals, on receipt of each edge in the message. Other sampling methods as well may be implemented in the sampling unit 4. The control unit 11 is then intended to select the sampling method that, at the time, is best and most suitable for optimum message reception. For this purpose, it analyzes the error signals 9 and 10 supplied by the decoder 6 and checking unit 7. If one or more error signals are being supplied, this is an indication that the sampling method currently being performed is not optimum. The control unit 11 then selects a more suitable sampling method and supplies a control signal 12 to this effect to a switch 43 in the sampling unit 4. The changeover is preferably not made the first time an error occurs and instead a plurality of successive error signals are analyzed and only then is a changeover made. Particularly with singular error events, there is often no sense in switching immediately to a different sampling method.

The sampling carried out in the sampling unit 4 can thus be adjusted dynamically to current conditions on the channel 2. Sampling to a fixed sampling pattern, for example, may be provided as the standard sampling method in the sampling unit 4. If the synchronization between transmitter and receiver is unsatisfactory, the decoder 6 and/or the checking unit 7 put out error signals to the control unit, and the control unit may, for example, cause a changeover to be made to the sampling method employing bitwise resynchronization.

Not only may the present invention be used for message transmission along transmission channels but so too, in a similar way, is it possible for the receiving circuit according to the invention or the method according to the invention to be employed for recording data on a storage medium or for reading data from a storage medium. When this is the case, the channel 2 shown in the FIG. 1 is replaced by a storage medium, e.g. a CD or a DVD. The input stage 3 would be an optical transmitting and receiving unit in this case.

The invention claimed is:

1. A receiving circuit for receiving a message signal, comprising:
    a sampling unit that is configured to convert the message signal into a sampled signal,
    an analyzing unit that is configured to decode the sampled signal and detect errors, and
    a control unit that is configured to control a sampling method in the sampling unit as a function of the errors detected,
    wherein provision is made in the sampling unit for sampling in accordance with a fixed sampling pattern as a first sampling method and for sampling with bitwise resynchronization as a second sampling method.

2. The receiving circuit of claim 1, wherein the analyzing unit includes:
    a decoding unit that is configured to detect errors in a code used to encode the message signal, and
    a detecting unit that is configured to detect errors at a message level.

3. The receiving circuit of claim 1, wherein the coded message signal is an edge-coded signal.

4. The receiving circuit of claim 1, wherein the edge-coded signal is a Xerxes-coded signal.

5. The receiving circuit of claim 1, wherein the sampling unit comprises an analog-to-digital converter.

6. The receiving circuit of claim 2, wherein the sampling unit comprises a threshold discriminator.

7. The receiving circuit of claim 1, wherein the control unit is configured to select a different sampling method to take place only after a number of error indications, which number can be preset.

8. A receiving circuit for receiving a message signal, comprising:
- a sampling unit that is configured to convert the message signal into a sampled signal,
- an analyzing unit that is configured to decode the sampled signal and detect errors, and
- a control unit that is configured to control a sampling method in the sampling unit as a function of the errors detected,
- wherein the message signal is an edge-coded signal corresponding to a Xerxes-coded signal.

9. The receiving circuit of claim 8, wherein the analyzing unit includes:
- a decoding unit that is configured to detect errors in a code used to encode the message signal, and
- a detecting unit that is configured to detect errors at a message level.

10. The receiving circuit of claim 8, wherein the control unit is configured to select a different sampling method to take place only after a number of error indications, which number can be preset.

11. The receiving circuit of claim 8, wherein the sampling unit comprises an analog-to-digital converter.

12. The receiving circuit of claim 8, wherein the sampling unit comprises a threshold discriminator.

13. A method comprising:
- sampling a message signal using a first sampling method to form a sampled signal,
- decoding the sampled signal to form a decoded signal,
- detecting errors in the decoded signal, and
- selecting between the first sampling method and a second sampling method used for subsequent sampling as a function of the errors detected,
- wherein the first sampling method includes sampling in accordance with a fixed sampling pattern, and the second sampling method includes sampling with bitwise resynchronization.

14. The method of claim 13, wherein selecting between the first and second sampling method is based on sequences of errors detected.

15. The method of claim 13, wherein sampling the message signal includes performing an analog-to-digital conversion.

16. The method of claim 13, wherein sampling the message signal includes threshold discrimination.

17. The method of claim 13, wherein when the second sampling method including sampling with bitwise resynchronization is currently used to sample the message signal and a plurality of errors are detected, then the first sampling method including sampling in accordance with a fixed sampling pattern is selected and subsequently used to sample the message signal.

18. The method of claim 13, wherein the coded message signal is an edge-coded signal.

19. The method of claim 18, wherein the edge-coded signal is a Xerxes-coded signal.

* * * * *